United States Patent [19]
Aiuppa

[11] 3,775,952
[45] Dec. 4, 1973

[54] RAKE ATTACHMENT FOR POWER SWEEPER

[76] Inventor: Francesco Aiuppa, W.207 S8286 Hillandale Dr., Muskego, Wis. 53150

[22] Filed: Sept. 5, 1972

[21] Appl. No.: 285,977

[52] U.S. Cl. .............................. 56/16.4, 56/400.02
[51] Int. Cl. ........................................... A01d 51/00
[58] Field of Search.................. 56/16.4, 16.6, 16.7, 56/16.9, 367, 400.02; 15/79

[56] References Cited
UNITED STATES PATENTS

| | | | |
|---|---|---|---|
| 2,546,620 | 3/1951 | Van Ness | 56/400.02 |
| 2,826,034 | 3/1958 | Feuerlein | 56/400.02 |
| 2,989,833 | 6/1961 | DeFino | 56/16.6 |
| 3,024,587 | 3/1962 | Warnke | 56/14.4 |
| 3,125,844 | 3/1964 | Beyer | 56/16.4 |
| 3,308,612 | 3/1967 | Oblinger | 56/15.9 |
| 3,478,500 | 11/1969 | Rhoads | 56/16.4 |

*Primary Examiner*—Russell R. Kinsey
*Attorney*—Henry C. Fuller, Jr.

[57] ABSTRACT

A power rake attachment for a power sweeper includes a rake assembly composed of rake half sections with each half section having two shaft clamping members with semi-circular loop portions. The half sections are assembled around the power shaft without removal of the shaft by securing the clamping members in opposed relationship around the shaft with bolts. The clamping members of each half section are interconnected by cross bars which carry spaced ground engaging tines.

6 Claims, 5 Drawing Figures

PATENTED DEC 4 1973 3,775,952
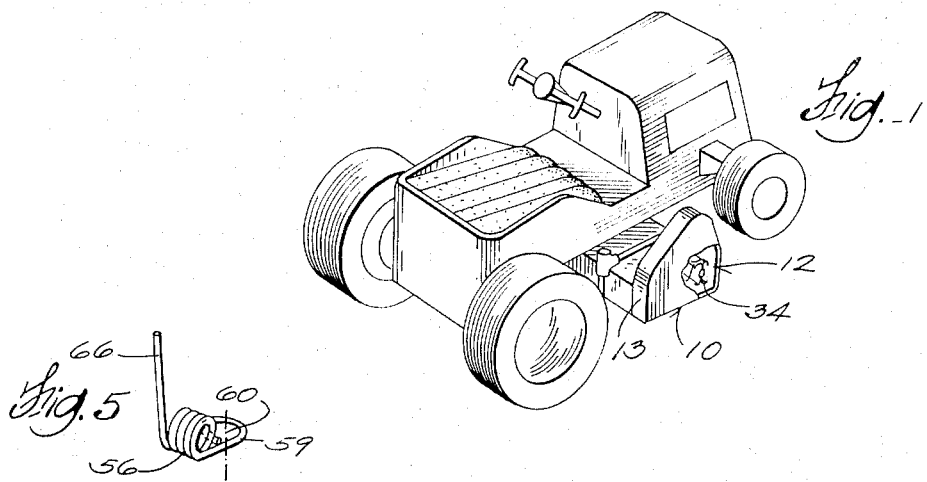
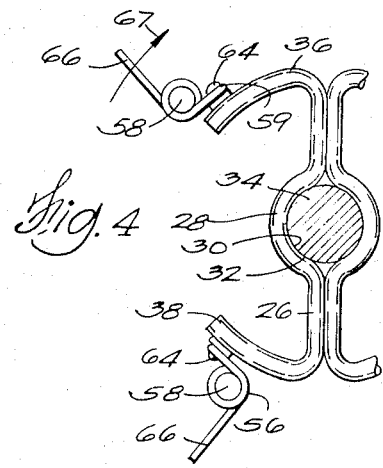
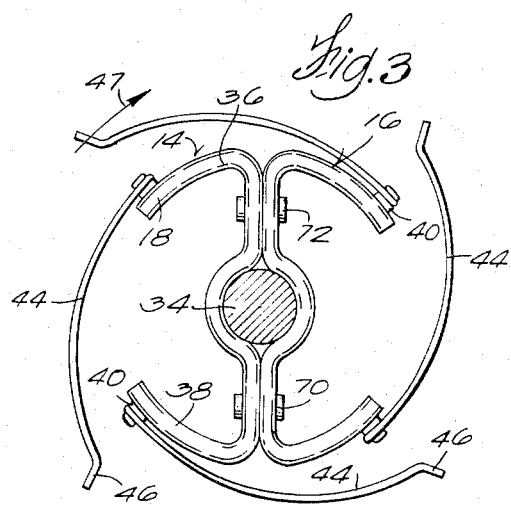
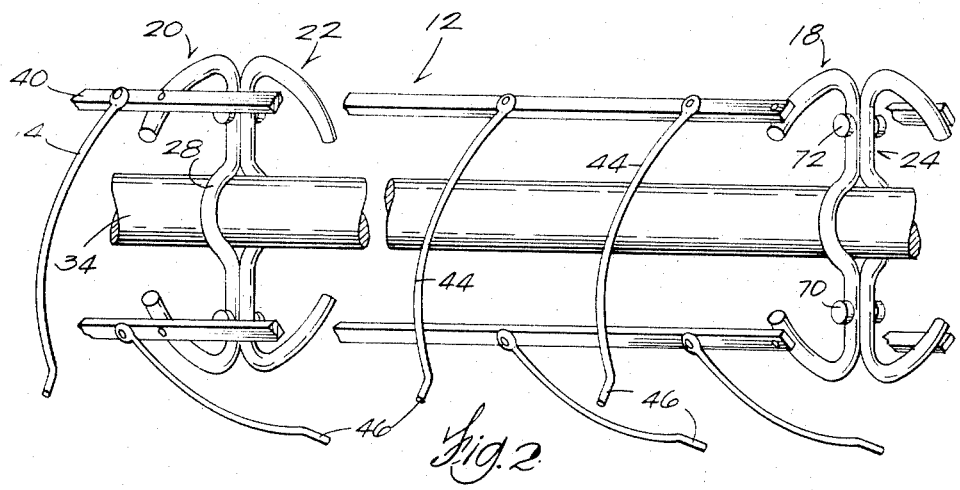

RAKE ATTACHMENT FOR POWER SWEEPER

BACKGROUND OF INVENTION

Power rakes are desirable for thatching lawns to remove dead vegetation so that moisture and fertilizers can easily benefit the grass roots. The thatching of lawns also prevents lawns from burning up because of too much dead vegetation above the ground which prevents roots from attaining a desirable penetration. Typically, the thatching operation should be performed at least twice a year, preferably in spring and fall. Because of the infrequent need for removal of thatch, there is not a very big demand for implements that are adapted solely for thatching.

SUMMARY OF INVENTION

The invention provides a rake attachment for a power sweeper such as that disclosed in my U.S. Pat. No. 3,676,886 which is easily assembled on the driven brush shaft after removal of the brush and without removing the shaft from the brush housing.

The rake attachment includes two rake half sections which together form a rake assembly with tines arranged throughout a 360° arc. Each half section has a clamping member with a web section having a semi-cylindrical loop and leg portions projecting in an arc from the web section. The leg portions are welded to cross bars which carry the ground engaging tines. The half sections are assembled around the shaft by bolts which extend through apertures in the clamping member web sections which are located intermediate the leg portions and the semi-circular loops. Four bolts are employed to easily assemble and disassemble the rake from the driven shaft.

Further objects, advantages and features of the invention will become apparent from the following disclosure.

DRAWINGS

FIG. 1 is a perspective view showing the power rake attachment of the invention mounted on a power sweeper.

FIG. 2 is an enlarged fragmentary perspective view of the rake attachment of the invention.

FIG. 3 is an end view of the rake attachment shown in FIG. 2.

FIG. 4 is a fragmentary end view of a modified embodiment of the rake with coil spring tines.

FIG. 5 is an enlarged perspective view of the modified coil spring tine shown in FIG. 4.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

FIG. 1 shows a power sweeper unit 10 of the type shown in my U.S. Pat. No. 3,676,886 in which the power rake attachment 12 is substituted for the brush in the brush housing 13. The rake attachment 12 includes two rake half sections 14 and 16 with each of the half sections having two spaced clamping members. Rake half section 14 has clamping members 18 and 20, and half section 16 has clamping members 22 and 24. Each of the clamping members includes a web section 26 with semi-circular loops 28 located intermediate the ends of the web sections. The loops have a curved surface 30 complementary to the periphery 32 of the driven shaft 34 which carries the rake attachment 12. Each clamping member includes leg portions 36 and 38 (FIG. 3) which extend from the web sections in an arc concentric with the semi-circular loop portions 28 and the shaft 30. The leg portions 36 and 38 are welded, bolted or otherwise secured to cross bars 40 which are spaced by about 90° of arc.

The cross bars 40 carry tines 44 which as shown in FIG. 3, comprise lengths of wire or rod extending in a direction counter of rotation of the rake 12 which is clockwise in FIG. 3 as shown by arrow 47. The tines 44 have out-turned terminal portions 46 which are adapted to engage the ground. The tines are desirably staggered on the four cross bars to provide good coverage.

In FIGS. 4 and 5, a modified embodiment of a tine 55 is shown in which a coil spring 56 has an axis 58 parallel to the axis of the driven shaft 34. A loop 59 having an axis 60 at right angles with the axis 58 enables the springs to project radially from the rake and be bolted to the cross bar by bolts 64. The tines 56 also include a ground engaging projection 66 which unwinds the spring when it engages the ground to provide more length to the end 66 and thus provide greater penetration. The direction of rotation of the rake in FIG. 4 is shown by the arrow 67.

Means are provided for securing the half sections in assembly with the clamping members in opposed relationship and securely embracing the driven shaft. In the disclosed construction, the means includes the opposed allochirally arranged loops 28 and bolts or other fasteners 70 which extend through apertures 72 in the web sections. The fasteners 70 and the loops 28 easily permit assembly and disassembly of the rake from the driven shaft 34 without removal of the shaft from the bearings or disconnecting the drive train. What is claimed is:

1. In a power lawn sweeper having a driven shaft extending transversely to the direction of movement of the sweeper, the improvement comprising a rake attachment for said sweeper, said rake attachment including two rake half sections, each of said half sections having two spaced clamping members, cross bars interconnecting said clamping members for each of said half sections, ground engaging tines connected to and projecting from said cross bars, and means for securing said half sections in assembly with said clamping members in opposed relationship securely embracing said driven shaft.

2. The improvement of claim 1 wherein each of said clamping members comprises a length of metal having web sections with a semi-circular loop intermediate the ends of said web section and leg portions extending from said web sections in arcs of a radius greater than the radius of said semi-circular loop portions and concentric with said semi-circular loop portions.

3. The improvement of claim 1 wherein said semi-circular loops have a curved surface complementary to the periphery of said shaft.

4. The improvement of claim 2 wherein said means for securing said half sections in assembly comprises apertures in said web sections of said clamping members, said apertures being located intermediate said loop and said leg portions, and bolts extending through said web sections to unite said half sections and clamping said semi-circular loop portions around said driven shaft.

5. The improvement of claim 2 wherein said cross bars are located adjacent the ends of said clamping member leg portions and wherein said tines comprise lengths of wire extending in a direction counter to the direction of rotation of said power shaft with terminal portions on each of said tines bent outwardly to engage the ground.

6. The improvement of claim 2 wherein said tines comprise lengths of wire having a spring coil portion with a coil axis parallel to the axis of said driven shaft and with projecting end portions extending from the coil portions, and loop portions having a loop axis at an angle of generally 90° with respect to the axis of said coil portions and bolts extending through said loop portions and securing said tines to said cross bars.

* * * * *